United States Patent [19]
Robbins, III

[11] Patent Number: 5,098,634
[45] Date of Patent: * Mar. 24, 1992

[54] METHOD OF EXTENSION BLOW-MOLDING CONTAINER HAVING UPPER AND LOWER SECTIONS OF DIFFERENT THICKNESS

[76] Inventor: Edward S. Robbins, III, 459 N. Court St., Florence, Ala. 35630

[*] Notice: The portion of the term of this patent subsequent to Jun. 6, 2006 has been disclaimed.

[21] Appl. No.: 354,862

[22] Filed: May 16, 1989

Related U.S. Application Data

[63] Continuation of Ser. No. 123,325, Nov. 20, 1987, Pat. No. 4,836,970, which is a continuation of Ser. No. 8,658, Jan. 30, 1987, abandoned.

[51] Int. Cl.$^5$ .............................................. B29C 49/04
[52] U.S. Cl. ..................................... 264/536; 264/154; 264/167; 264/541; 264/DIG. 33
[58] Field of Search ............... 264/514, 515, 536, 540, 264/541, 248, 167, 154, DIG. 33; 425/532

[56] References Cited

FOREIGN PATENT DOCUMENTS 974596 11/1964 United Kingdom ................ 264/541

*Primary Examiner*—Jan H. Silbaugh
*Assistant Examiner*—Catherine Timm
*Attorney, Agent, or Firm*—Nixon & Vanderhye

[57] ABSTRACT

A container having upper and lower portions, the lower portion having self-supporting side walls and a bottom wall. The upper portion is flexible and non-self-supporting. Preferably, the upper and lower portions are formed of plastic material with the upper portion forming a unitary continuation of the lower portion. The entire container may be formed using blow molding techniques or other conventional means such as co-extrusion.

5 Claims, 4 Drawing Sheets

METHOD OF EXTENSION BLOW-MOLDING CONTAINER HAVING UPPER AND LOWER SECTIONS OF DIFFERENT THICKNESS

This application is a continuation of U.S. application Ser. No. 123,325 filed on Nov. 20, 1987, now U.S. Pat. No. 4,836,970, which application in turn is a continuation of Ser. No. 8,658 filed on Jan. 30, 1987 (now abandoned).

BACKGROUND OF THE PRESENT INVENTION

The present invention relates to a container and methods for forming the container. Particularly, the present invention relates to a disposable and/or reusable container formed of plastic material and methods of forming the container.

Different types, styles, and constructions of containers have long been known and used in the past. Likewise, many different materials have been used in the manufacture of containers. For example, the common paper bag, comprised of four side walls, and a bottom wall formed from overlapping and glued flaps of paper, is a well-known construction eminently suitable for its purpose. Cardboard containers, such as boxes, are also quite common and have been provided in various configurations and constructions for a variety of purposes. Plastic containers, such as bottles for containing liquids or thin film plastic bags for disposing of trash, are likewise well known and variously constructed and used. Containers formed of plastic materials have significant advantages in comparison with prior paper or cardboard containers. For example, plastic containers are strong, resilient, long-lasting, and inert to most items disposed in the container. They are also suitable for containing and confining fluid materials. Additionally, plastic containers may be currently produced at extremely low cost and may therefore constitute throwaway or disposable items after use. Common plastic containers of the thin film type, however, have a significant disadvantages in comparison with paper or cardboard containers in that the latter are generally self-supporting or freestanding in their intended shape. On the other hand, containers formed of thin plastic film are generally not capable of assuming or maintaining a predetermined shape.

Further, in many environments, paper, cardboard and plastic bags are not suitable for use alone and must be used in conjunction with other containers or support structure. For example, it is common practice to provide a container formed of a self-supporting plastic material and then to line the container with a paper or plastic bag. Paper bag liners, of course, lack strength, resilience and the capacity to contain and confine liquid materials. Plastic bag liners, on the other hand, are easily punctured by the contents of the container. In certain applications, for example trash disposal, it is also necessary to lift the paper or plastic liner from the supporting container and replace it with a fresh paper or plastic bag liner. Paper or plastic bag liners frequently break or tear when lifted from a supporting container. Tearing is often caused by depositing material into a plastic liner and frequently, in the case of paper liners, by a weakening of the bag in the areas where fluid has been absorbed. Additionally, when such paper or plastic liners fail, the supporting container usually must be cleaned.

Additionally, thin film plastic bags or containers are well known and commonly used by themselves without any supporting structure. However, because these bags are not self-supporting or freestanding, great difficulty attends their filling in the absence of an ancillary support structure. For example, thin film plastic bags are commonly used for disposing of leaves. However, filling these bags with leaves or even maintaining the bag open for filling purposes is difficult because the bags will collapse absent a supporting structure. Thin film plastic bags thus do not have shape-retaining characteristics.

SUMMARY OF THE PRESENT INVENTION

In accordance with the present invention, there is provided a container comprised of an enclosure having upper and lower portions, the lower portion including self-supporting side walls and a bottom wall. The upper portion of the container is flexible and non-self-supporting whereby the container may stand in an upright orientation with the side walls supporting the upper and lower portions. Preferably, the side walls of the lower portion are formed of a plastic material of predetermined thickness, while the upper portion is likewise formed of a plastic material of a predetermined thickness less than the thickness of the plastic material forming the lower portion. Thus, the lower portion is formed of a plastic material having a wall thickness sufficient such that the container is self-standing or self-supporting. The wall thickness of the lower portion can also be modified as desired so as to be sufficient to avoid puncturing by materials disposed within the container, and to afford sufficient strength and rigidity to maintain the container in its intended configuration without significant distortion or flexing.

The upper portion of the container preferably constitutes a flexible integral extension of the side walls of the lower portion. That is, the side walls and the upper portion are of unitary one-piece plastic construction one with the other with the upper portion constituting a thin film of plastic material forming a continuation of the side walls. As alluded to hereinafter, the flexible upper portion terminates in a free end which may be gathered together and secured, for example, by a tie, to close the upper end of the container. With the container thus closed, it may be transported as desired and, if used as a trash container, may be discarded and disposed of together with the trash contained therein.

A significant advantage of the present invention resides in the preferred unitary one-piece or integral construction of the container. This enables the container to be produced at low cost and, thus be disposable or reusable as desired. On the other hand, the container may also be constructed in other ways, such as by the attachment via heat sealing (or other well known means) of a separately formed upper portion to the lower portion.

Accordingly, and in accordance with another aspect of this invention, the container may be formed using blow-molding techniques. To accomplish this, the plastic material is extruded from a die head to form a parison. When extruding the material, the die head preferably first extrudes a thin film of the plastic material to form a first parison section which eventually will form the upper flexible portion of the container. The die head is then adjusted to extrude plastic material to form a second parison section having a greater wall thickness than the first parison section and which will ultimately form the lower portion of the container. After such extrusion, opposed mold platens, which straddle the parison, move under the extrusion head to close about the parison. As the mold platens close about the parison, a blow pin is inserted into the mold and parison. The parison is then inflated by introducing air through the blow pin and into the parison to form the plastic material to the desired configuration. Upon subsequent removal from the mold and inversion, there is thus formed a unitary one-piece container having a flexible upper portion and a lower portion having self-supporting side walls and a bottom wall.

Where the container hereof is intended in use to displace containers having disposable liners as discussed above, it will be appreciated that the present container does not require a separate liner. The lower portion affords the necessary structural strength to support the container and to maintain its container shape and integrity. The upper portion permits ready and easy closing of the container, for example, by using conventional ties. The low cost of the plastic materials forming the container and the use of blow molding techniques enables the container to be economically disposable. The container may also, of course, be reused if desired. Furthermore, because of the variable thickness of the side walls and bottom wall, the container may hold sharp objects, for example, broken glass or disposable hospital paraphernalia including syringes, etc., without being punctured, torn or ripped as might otherwise happen when using paper or thin film plastic liners in rigid containers.

Additionally, handles may be formed in either the lower self-supporting portion or the upper flexible portion of the container or both. Thus, in the molding process, indentations may be provided along opposite sides of the lower portion of the container to provide finger grips. Other types of handles may obviously be accommodated in the molding process and applied to the lower portion. The upper flexible portion may be provided in the mold with additional handles or may be cut to form handle openings along opposite sides and adjacent the upper free end thereof. Thus, the container may be lifted using the handles formed in the flexible portion or by handles formed in the structural lower portion as desired.

Another important aspect of the present invention resides in the capability of stacking containers constructed in accordance with this invention. To accomplish this, the side walls of the lower portion may be tapered outwardly and upwardly such that the containers may be nested one within the other for transportation and storage prior to use. To accommodate this, the flexible upper portion of each container may be disposed within the lower portion. Thus, when the containers are nested, the upper portion may be disposed between its associated lower portion and the next adjacent container when the latter is nested into the former. Alternatively, if the upper flexible portion is likewise tapered, the flexible upper portion may project away from the lower portion. The containers may thus be nested with the flexible portion extending from each container. A further alternative includes collapsing the flexible upper portion externally about the lower portion. Thus, the flexible portion, when the containers are nested, may be either received within the adjacent container or extended about the adjacent container.

A further optional feature of the present invention includes a cover for the container. In this form, the cover may be formed by conventional blow-molding or other known plastic molding techniques. Fastening means are preferably provided adjacent the margin of the cover for releasably securing it to the upper margin of the lower portion of the container. Such releasable securing means may take the form of screw threads, interlocking lugs, bayonet-type joints, or key and keyhole slot type joints. A cover is useful in those situations where the material in the container is required to be or should be covered. In practice, the cover may be formed of substantially rigid plastic material. It may be disposable along with the container, may be reusable with other disposable containers or used for so long as the container is used and reused.

Accordingly, it is a primary object of the present invention to provide a novel and improved container and a method of forming the container which minimizes or eliminates the foregoing and other drawbacks and disadvantages of prior containers. The container of the present invention is simple and inexpensive to construct, readily disposed in a stacked or nested condition for transportation, storage, and/or use and disposable or reusable as desired. It has puncture-proof and fluid retention characteristics, and importantly, may be formed simply, easily and inexpensively of unitary one-piece plastic material.

It is specifically contemplated that the present invention shall have a very wide variety of potential usages. For example, it can be used for holding trash, storing materials, shipping chemical, packaging food (milk, cheese, ice cream and the like), etc. The foregoing examples are only some of the potential uses of the invention and are not meant to be a complete listing of all possible uses.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the preferred embodiment of the present invention, several examples of which are illustrated in the accompanying drawings.

Figure 1:
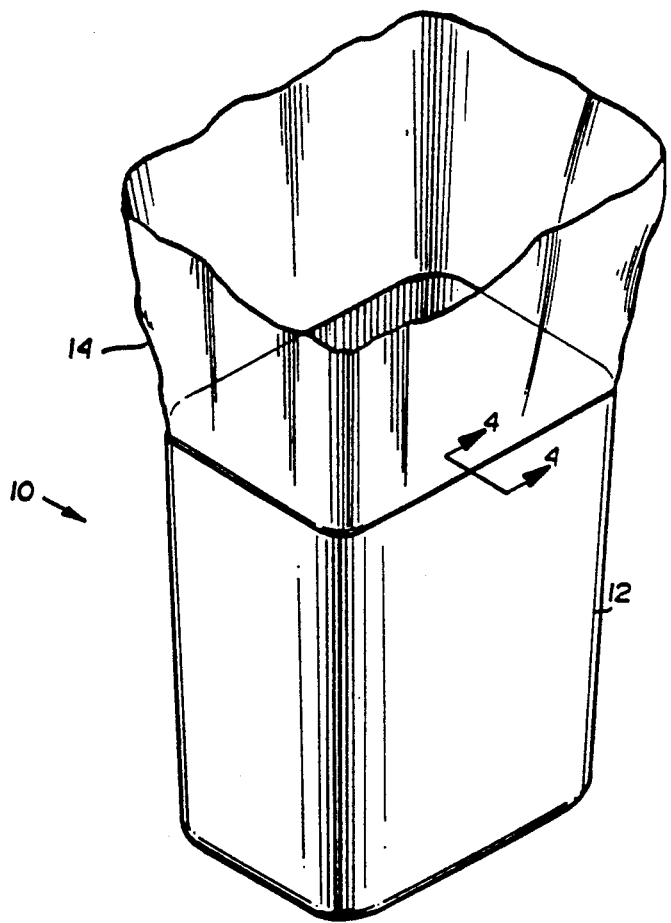
FIG. 1 is a perspective view of a container constructed in accordance with the present invention and illustrating the upper portion of the container in an open condition.

Referring now to the drawings, particularly to FIG. 1, there is illustrated a container, generally designated 10, constructed in accordance with the present invention. The container 10 includes lower and upper portions 12 and 14, respectively, preferably formed of a unitary one-piece plastic construction. Container 10 also includes a bottom wall 16 (FIG. 6) which is also preferably formed unitarily with the lower and upper portions 12 and 14, respectively, of container 10. Lower and upper portions 12 and 14, respectively, are also generally tubular in cross-section and the side walls thereof may have any desired cross-sectional shape, i.e., circular, square, rectangular, etc., at any elevation along the height of the container.

Figure 4:
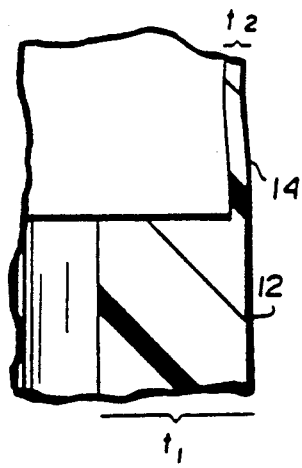
FIG. 4 is an enlarged fragmentary cross-sectional view taken generally about on line 4—4 in FIG. 1.

It is a particular feature of the present invention that the lower and upper portions 12 and 14, respectively, of container 10 are formed integrally of a plastic material having different thicknesses. In a preferred form of the present invention and as best illustrated in FIG. 4, the lower portion 12 has side walls formed of a plastic material having a wall thickness t1. Thickness t1 is sufficient such that the side walls are self-supporting. That is to say, the side walls of container 10 are sufficiently rigid or structural so that the container in its upright position is self-standing or self-supportable. In this connection, where the side walls form the self supporting means, the base or bottom wall 16 can be of any thickness desired by the user, including being of the same thickness a upper portion 14.

Not only does this afford stability to the upstanding container 10, but also provides a container which is relatively puncture-proof, has sufficient self or structural rigidity to retain its shape as a container, and is leakproof. Thus, the advantages and benefits which accrue to conventional containers formed of plastic material and which containers retain their shape, definition and integrity as a plastic container of predetermined configuration will likewise accrue to container 10 hereof.

The upper portion 14 of container 10 is formed integrally or unitarily with lower portion 12 and of the same plastic material, as will be apparent from the ensuing description. The plastic material forming the upper portion 14 preferably, and in accordance with the present invention, has a wall thickness t2 which is normally substantially less than the thickness t1 of the side walls of lower portion 12. However, it should be noted that the particular thickness of the upper and lower portions is also dependent upon the materials selected. Since any plastic, or equivalent, material may be utilized it can be envisaged that different materials will be used to form the upper and lower portions. As a result, the thickness of the upper flexible portion may, with the appropriate selection of materials, be about the same thickness as the self-supporting side walls of the lower portion.

Particularly, the wall thickness t1 of upper portion 14 is such that upper portion 14 comprises essentially a thin film of plastic material which is highly flexible and non-self-supporting. By non-self-supporting is meant that, in the absence of other support structures and any structural rigidity imparted to the upper portion by its tubular shape, the film of material would collapse of its own weight onto itself. Thus, because the upper portion constitutes a tubular thin film extension of the self-supporting tubular lower portion, it will, to a limited extent and by virtue of its tubular construction and that of the lower portion, stand up of its own accord but would otherwise be collapsible under its own weight. Thus, it will be appreciated that in accordance with the present invention there is provided a container wherein the side walls of the lower portion 12 are formed of a plastic material of a predetermined thickness wherein the side walls are self-supporting while the upper portion is formed of a flexible plastic material of a thickness less than the thickness of the plastic material forming the lower portion.

Preferably, the container hereof is formed integrally of high-density polyethylene. Other types of plastic or comparable materials, however, may be used, such as low-density polyethylene, polypropylene or other plastic olefins.

In forming the unitary container hereof, the lower portion may be formed of plastic material having a wall thickness t1 of about 5-250 mils, whereas the wall thickness t1 of the upper portion 14 may be about 1-40 mils. However, it will be recognized that thicknesses outside of these ranges can be used for certain applications, provided only, however, that lower portion 12 have side walls which are self-supporting or self-standing and upper portion 14 have side walls formed of a flexible material which can be folded, gathered or collapsed and which, of itself, is non-self-supporting.

Figure 5:
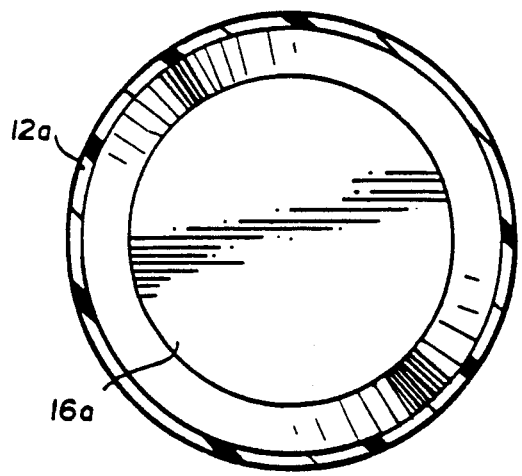
FIG. 5 is a horizontal cross-sectional view of a cylindrical container constructed in accordance with the present invention and taken through the lower portion thereof.

As indicated previously, container 10 may be provided in various convenient shapes. For example, in the container illustrated in FIG. 1, the lower portion 12 is generally rectilinear having opposed parallel side walls. In FIG. 5, the lower portion 12a of container 10a is generally frustoconical in shape wherein lower portion 12a tapers upwardly and outwardly from bottom wall 16a. In the form of container hereof illustrated in FIG. 6, the lower portion 12b of container 10b has side walls which taper outwardly and upwardly from bottom wall 16b. Other configurations of the lower portion of the container hereof will be readily apparent.

Figure 8:
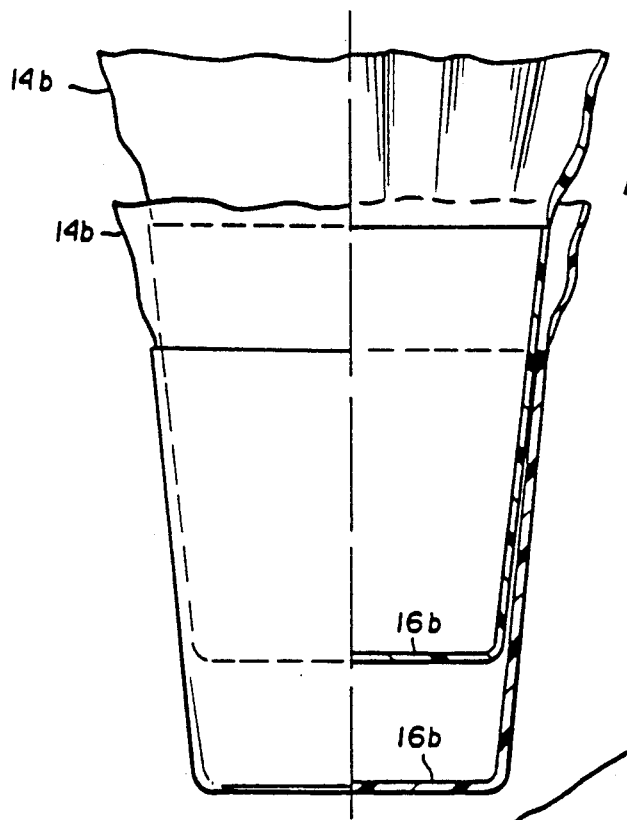
FIG. 8 is a view similar to FIG. 7 illustrating another configuration of stacked containers.

The upper portion 14 of the container is preferably similarly shaped in cross-section as lower portion 12. Preferably, it comprises a tubular extension of the same cross-sectional configuration as lower portion 12. Where the lower portion tapers upwardly and outwardly, the upper portion may likewise continue the upward and outward taper of the lower portion, e.g., as illustrated in FIGS. 8 and However, it is not necessary that the upper portion conform to the taper of the lower portion.

Turning back to FIGS. 1 and 2, it will be appreciated that container 10 may be disposed in an upright self-supporting condition wherein the upper margin of lower portion 12 forms an opening into the container. The upper portion 14 in use may be folded back about the side walls of lower portion 12 externally of the container. The container may then be filled as desired.

Figure 2:
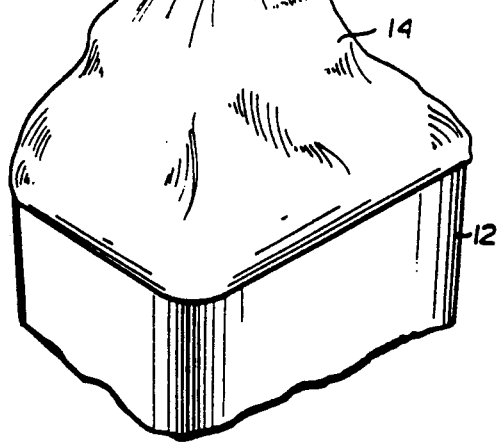
FIG. 2 is a fragmentary view similar to FIG. 1 illustrating the upper portion of the container in a closed condition with one form of a closing device therefor.

When full, upper portion 14 is then disposed above lower portion 12 as illustrated in FIG. 1 and gathered, folded or collapsed into the condition illustrated in FIG. 2, to form a neck 18 of reduced diameter. Because the material forming upper portion 14 is flexible, e.g., formed of thin plastic film, upper portion 14 may be readily gathered, collapsed or folded to form neck 18. A conventional paper-covered wire tie 20 may then be wrapped about upper portion 14 at neck 18 to close the container. Container 10 may be discarded in its entirety, whereby container 10 constitutes a disposable container.

Alternatively, the container, with its upper portion 14 open, may be emptied of its contents and reused. Because the materials forming the container are relatively inexpensive and the different thicknesses of the materials of the container are readily and easily formed in available molding machinery as set forth below, it will be appreciated that there is provided a relatively inexpensive container which may be either disposable or reusable.

In either use, the present container avoids the problems associated with prior rigid containers, such as trash containers wherein disposable liners are provided as separate and separable elements forming part of the trash container, yet provides many of the advantages of a conventional non-self-supporting thin film plastic bag in the provision of a flexible upper portion for the container hereof which may be gathered and tied off to close the container. The present container is thus a hybrid of substantially rigid and thin film containers having certain of the advantages of both, the disadvantages of neither, and affording certain additional benefits as may be realized from this description. In this regard, it is believed significant that, although such prior art containers have been in existence for many years prior hereto, applicant is unaware of any use, sale or manufacture of the present invention. Such evidence speaks eloquently of the unobvious nature of this invention.

Figure 3A:
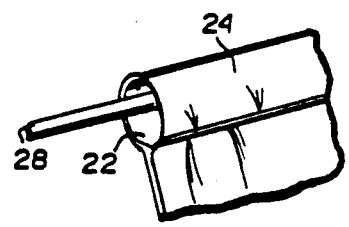
FIG. 3a is an enlarged fragmentary perspective view of a portion of the closing device for the container illustrated in FIG. 3.
Figure 3:
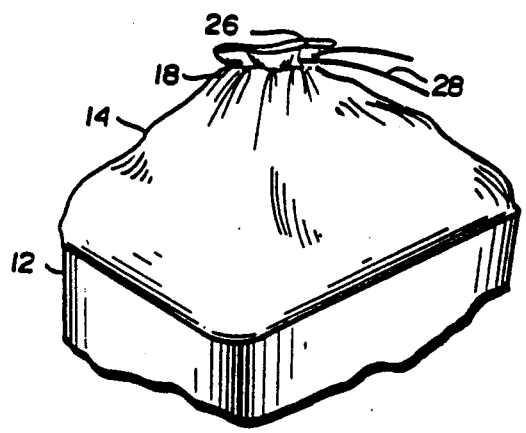
FIG. 3 is a view similar to FIG. 2 illustrating another form of closing device for the upper portion of the container.

Referring now to FIGS. 3 and 3a, the upper portion 14 of container 10 may be provided with many other forms of closure, for example, a drawstring. In this form, a passage 22 is formed about the upper margin of upper portion 14 by folding over that margin as illustrated at 24 and heat sealing it to upper portion 14. A cutout 26 may be formed in one side of the margin, enabling a drawstring 28 to be threaded through passage 22. The drawstring may comprise a flexible plastic band or a cord or other suitable material. Suffice to say, when the container is filled, the drawstring 28 may be pulled to gather the upper portion 14 and tied to effect closure of the container.

Figure 6:
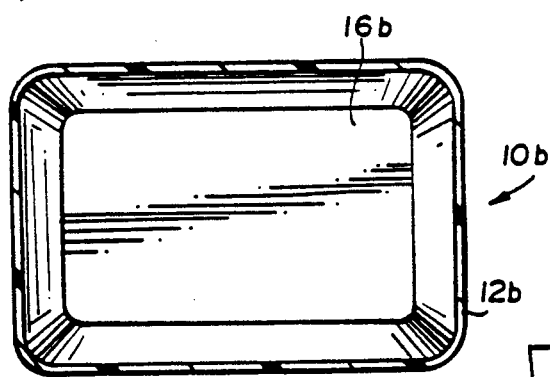
FIG. 6 is a view similar to FIG. 5 and illustrating a container generally rectangular in cross-section constructed in accordance with the present invention.
Figure 7:
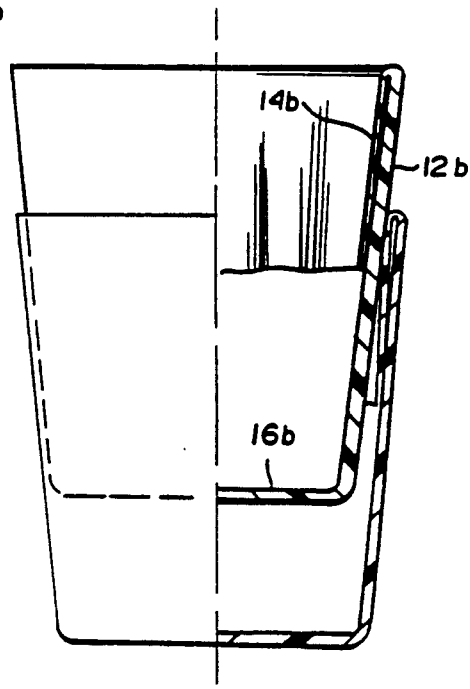
FIG. 7 is a side elevational view with portions in cross-section illustrating containers hereof in a stacked or nested condition.

In one important aspect of the present invention, the containers hereof are provided in configurations wherein they can be stacked or nested with one another to minimize the space required for transportation and storage. Additionally, the containers may be used in their stacked condition by using the uppermost stacked container, removing it when filled from the stack and then using the next stacked container. To this end and as best illustrated in FIGS. 6 through 8, the containers are preferably formed in a tapered configuration. Thus, each of the side walls of the lower portion 12b tapers upwardly and outwardly relative to the other side walls and from the bottom wall whereby the containers can be nested one within the other, as illustrated in FIG. 7. In one form of nested or stacked containers, the upper portion 14b may be folded within the container prior to stacking. An upper nesting container may then be inserted bottom first into a lower container such that the upper portion 14b of the lower container is disposed between the side walls forming its lower portion 12b and the side walls of the lower portion 12b of the upper container.

Alternatively, and as best illustrated in FIG. 8, the upper portions 14b of the stacked or nested containers may extend outwardly in a direction away from lower portion 12b. In this form, each nested container is received within the underlying container and the upper portion of the receiving container overlies the outer upper margins of the nested container. Alternatively, the containers may be stacked with the thin portions folded over the outside of the side walls of the container.

Figure 9:
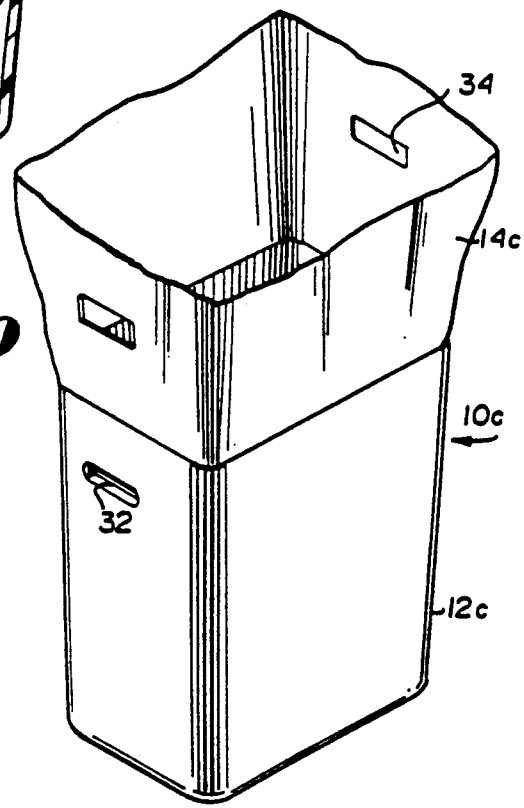
FIG. 9 is a perspective view of the container hereof illustrating handles or grips on both the lower and upper portions.

In a further form of the invention illustrated in FIG. 9, integrally formed handles are provided container 10c. In one form, such handles may comprise indentations 32 integrally formed in the side walls of the lower portion 12c to provide lifting grips whereby the container 10c may be lifted. Alternatively, other types of handles may be provided the lower rigid self-supporting portion 12c, such as pivoted wire or plastic handles. Suffice to say, handle grips 32 provide a ready and convenient way to grip or grasp the container when it is necessary to lift the container.

In another alternative embodiment, handles may be provided upper portion 14c. In one form, slots or cutouts 34 may be formed in either or both of the opposite sides of upper portion 14c. Thus, an individual wishing to lift the bag, may grab container 10c by inserting his hands through the slots 34.

Alternatively, the upper portion 14c may be gathered such that handles 34 register one with the other whereby an individual's hand may be inserted through both slots 34. It will also be appreciated that other types of handles may be provided upper portion 14c. For example, loops, not shown, may be integrally formed to project from the upper margin of upper portion 14c at oppositely located positions, similarly as cutouts 34 are located, whereby the loops can be grasped to lift container 10c. The handles provided upper portion 14c and lower portion 12c may be provided alternatively or conjunctively.

Figure 10:
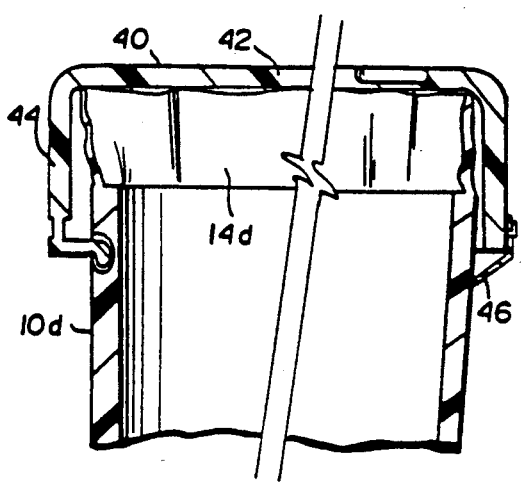
FIG. 10 is a cross-sectional view of a container constructed in accordance with the present invention and illustrating its use with a detachable cover.

Referring now to FIG. 10, a cover or lid 40 may be provided container 10d. Cover where it is desirable to releasably seal the container 10d or provide a more rigid cover for the container. In this form, cover 40 has a top 42 and depending side walls 44 which substantially conform to the cross-sectional shape of the upper margin of lower portion 10d. It can be of any shape and/or have any type of sealing means so long as it serves to act as a cover.

Thus, in the illustrated closed position of cover 40, side walls 44 telescope over the upper margin of lower portion 12d. Along one side wall 44, there is provided a key for engaging in a key slot formed along a wall portion of lower portion 10d, enabling the cover to be hingedly mounted to container 10d. At the opposite side of the cover from the hinged mounting, a latch 46 is provided whereby the cover may be releasably secured in the illustrated closed position and pivoted back about the hinge to an open position. Upper portion 14d of container 10d, because of its flexible nature, may be simply collapsed onto itself when the cover 40 is moved to close the container.

Alternatively, upper portion 14d may be closed, as in FIGS. 2 or 3, before the cover is pivoted down into its closed position, thus effecting a double seal. Preferably, the cover 40 is releasably secured to container 10d so that it may be wholly . detached from the container. This enables cover 40 to be reusable with other containers. Alternatively, the cover, being formed of similar inexpensive materials as container 10d, may be disposable with container 10d, as desired.

Figure 11:
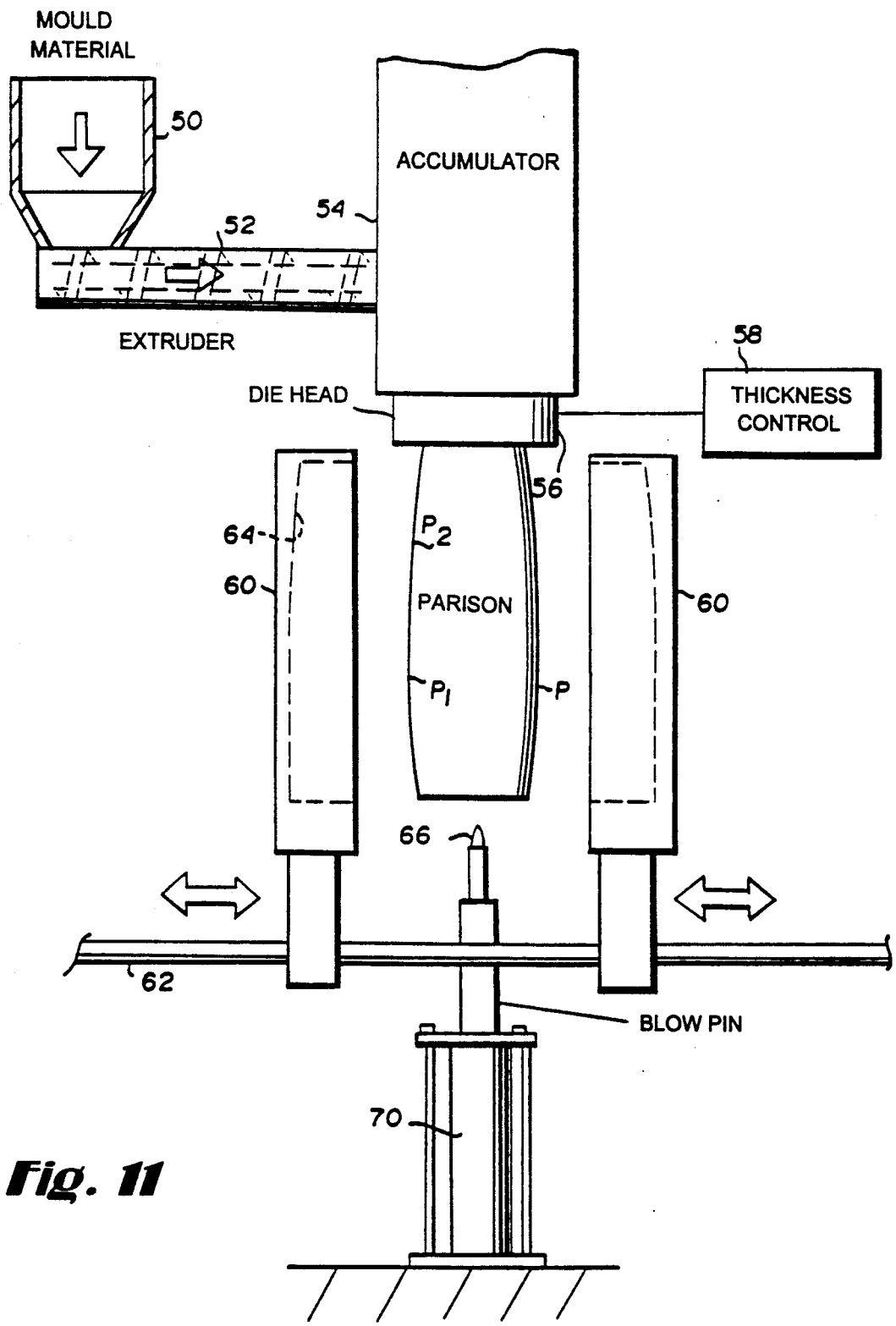
FIG. 11 is a schematic view illustrating a method of forming a container constructed according to the present invention.

Referring now to FIG. 11, there is provided a schematic illustration of apparatus useful for the manufacture of the containers described above. According to the present invention, the container hereof may be manufactured using blow molding apparatus. In this apparatus, plastic material is disposed in a hopper 50 which transfers the material to an extruder 52. Thus, the raw plastic material is fed from hopper 50 into extruder 52, where it is plasticized and transported to an accumulator 54, having a lower die head 56. Die head 56 includes a variable width slit formed between two mold parts, the slit being in the general shape of a circle. The wall thickness of the resulting container may be regulated by a conventional thickness control indicated 58.

Below die head 56 are located a pair of mold platens 60, movable toward and away from one another along suitable guides 62. Preferably, a hydraulic mechanism, not shown, is used to move the mold platens 60 toward and away from one another. The mold platens have mold surfaces 64, which conform to the shape of the final product. In this case, the mold surfaces 64 are semi-cylindrical surfaces tapered outwardly and downwardly from top to bottom, for reasons discussed hereinafter.

Below the die head and the mold platens 60 is a blow pin 66, which is adjustable in height by a suitable hydraulic mechanism 70. The blow pin is used to blow air into the parison P when the mold is closed.

To form the container hereof, mold material flows through hopper 50, extruder 52, into the accumulator 54 for extrusion through the slit in the die head 56. The mold material, preferably polyethylene, is extruded from the slit in the form of a cylindrical parison P, which is open at its lower end. When a suitable length of parison p has been extruded, the blow pin 66 is adjusted to enter the open end of the parison and the mold platens 60 are moved toward one another to close about the parison. Air is then ejected through the blow pin into parison P to inflate it for conformance to the mold walls of mold platens 60. It will be appreciated that the closing of the mold pinches off the upper end of parison P and the inflation of the parison forms closed upper and lower ends within the mold.

In accordance with the present invention, the plastic material is extruded from the die head 56 to form a first parison portion P1 having a predetermined thickness. The thickness control 58 is operated such that a second parison portion P2 is formed having a thickness substantially greater than the thickness of the plastic material forming parison portion P1. The parison portion P1 corresponds to the plastic material which will ultimately form the upper portion 14 of the container while the parison portion P2 comprises the plastic material which will ultimately form the lower portion 12 of the container 10. Consequently, it will be appreciated that the molding of the container shown here is accomplished in an inverted manner, upper portion 14 being extruded from the die head 56 prior to extrusion of the lower portion 12. The walls 64 of the mold platens, as illustrated, are tapered in a downwardly and outwardly direction such that a tapered container may be provided. Also, the lower end of the product is cut, preferably by explosion cutting, such that the final product will be open at that end. After cooling, the mold platens are separated and the container is removed from the blow molding apparatus.

In addition, the present invention also contemplates that the container be made by conventional co-extrusion processes whereby any number of layers of material may be utilized to form the upper and lower portions. Thus, for example, one or more different materials can be utilized to make the upper and lower portions. This method of production would be useful, for example, in making food containers. In such an application, the outer layer(s) of the lower portion could be made from plastic to give structural strength while the inner layer(s) could be made from FDA approved food grade plastic or other non-plastic materials. Of course, in order to make multiple layers, it will be necessary to utilize multiple extruders and accumulators. Such co-extrusion processes are well-known in the art.

It will thus be appreciated that in accordance with the present invention there has been provided a novel and improved container and method of making the container which is relatively inexpensive to construct, formed of a one-piece plastic construction, and is either disposable or reusable as desired. It will also be appreciated that there are a multiplicity of uses for the container hereof in either its disposable or reusable form, including use as a trash container.

While the invention has herein been shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent containers and methods for manufacturing containers.

I claim:

1. A method of making a plastic container comprising an enclosure having a generally tubular side wall and an opening formed in said side wall, said method comprising the steps of:

forming a generally tubular parison with corresponds to said generally tubular side wall by continually sequentially extruding a tubular parison having one and another portions of predetermined different wall thicknesses from a plastics material such that said one and another portions are integral tubular extensions of one another, and such that the predetermined thickness of said one portion is substantially less than the predetermined thickness of the other portion to impart flexible, gatherable and non-self-supporting characteristics to that region of said generally tubular side wall corresponding to said one parison portion and self-supporting characteristics to another region of said generally tubular side wall corresponding to said another parison portion;

disposing said generally tubular parison having said one and another portions in a blow mold having mold walls which are sized and configured to a desired shape of said container;

urging said one and another portions into conformance with the mold walls to form said tubular side wall having said non-self-supporting region and said self-supporting region; and forming said opening in said sidewall by removing a part of said plastic material forming said side wall to form the container.

2. A method as in claim 1 which includes forming said one and another portions integrally of high-density polyethylene.

3. A method as in claim 1 wherein said another parison portion has a first wall thickness which is substantially self-supporting and corresponds to a lower portion of said container, and said one parison portion has a second wall thickness which is substantially less than said first wall thickness which is to be flexible, gatherable and non-self-supporting and corresponds to an upper portion of said container, and wherein the step of extruding said tubular parison includes extruding said one parison portion prior to sequentially extruding said another parison portion.

4. A method as in claim 3, including extruding said one parison portion in a generally downward direction followed by sequentially extruding said another parison portion in the same generally downward direction following the one extruded portion, whereby said one and another portions are inverted, and disposing said one and another parison portions in said mold in said inverted position.

5. A method as in claim 1, wherein said generally tubular side wall of said container is generally cylindrical.

* * * * *